United States Patent [19]

Clementson et al.

[11] 3,932,297

[45] Jan. 13, 1976

[54] SOLVENT COMPOSITIONS FOR CLEANING

[75] Inventors: John Joseph Clementson; Arisztid Lajos Horvath, both of Runcorn, England

[73] Assignee: Imperial Chemical Industries Limited, London, England

[22] Filed: Jan. 14, 1974

[21] Appl. No.: 433,403

[30] Foreign Application Priority Data

Feb. 2, 1973 United Kingdom................. 5238/73

[52] U.S. Cl............................ 252/171; 252/DIG. 9
[51] Int. Cl.²......................................... C11D 3/43
[58] Field of Search ...... 252/171, 170, 364, DIG. 9; 260/652.5

[56] References Cited
UNITED STATES PATENTS

| | | | |
|---|---|---|---|
| 3,000,978 | 9/1961 | Fredenburg..................... | 260/652.5 |
| 3,499,047 | 3/1970 | Cormany ......................... | 260/652.5 |
| 3,549,715 | 12/1970 | Cormany ......................... | 260/652.5 |
| 3,767,585 | 10/1973 | Sawabe et al...................... | 252/171 |

Primary Examiner—William E. Schulz
Attorney, Agent, or Firm—Cushman, Darby & Cushman

[57] ABSTRACT

A solvent composition which comprises 1,1,1-trichloroethane and an aliphatic alcohol containing at least two carbon atoms in amounts such that the composition boils in the range from the boiling point of the constant boiling mixture of 1,1,1-trichloroethane and the alcohol up to 10°C above the boiling point.

3 Claims, No Drawings

SOLVENT COMPOSITIONS FOR CLEANING

This invention relates to compositions suitable for general purpose cleaning and more particularly to compositions for cleaning printed circuit boards.

1,1,1-trichloroethanes containing a small proportion of stabilisers is well known as a general purpose cleaning solvent but may not provide the necessary degree of cleaning of the articles being treated. For example in the manufacture of printed circuit boards soldering operations are carried out on the rear surface of the board i.e. on the surface opposite that on which the electronic components, transistors and the like are affixed. The rear surface of the board therefore becomes contaminated with solder fluxes which usually are resinous materials containing activators such as amine hydrohalides. In addition metal halides and general dirt may be deposited on the surface of the board. Such contamination can be removed by wiping or scraping but these processes are very difficult to carry out satisfactorily due to the uneven and often rough surface resulting from the soldering operation. Also, they may result in damage of the soldered joints by abrasion. Normally the rear surface of printed circuit boards is cleaned by means of a solvent or solvent composition with which the surface is contacted for an appropriate period of time, for example from 10 to 20 seconds. The composition usually is agitated for example by ultrasonic agitation. The solvents hitherto commonly used for this purpose are stabilised 1,1,1-trichloroethane and perchloroethylene, the latter containing low molecular weight esters, for example amyl acetate. These solvents are efficient in removing the resinous components of solder fluxes but they tend not to remove satisfactorily the activators contained in most flow solder fluxes.

According to the present invention we provide a solvent composition comprising 1,1,1-trichloroethane and an aliphatic alcohol containing at least two carbon atoms in amounts such that the composition boils in the range from the boiling point of the constant boiling mixture of 1,1,1-trichloroethane and the alcohol up to 10°C above said boiling point.

Compositions boiling up to 10°C above said boiling point normally contain a major proportion of 1,1,1-trichloroethane. Preferably the composition boils at a temperature not greater than 5°C above that of the constant boiling mixture.

According to another feature of the invention we provide a method of cleaning articles which comprises treating the articles with said solvent composition.

We particularly prefer to employ compositions such that they have a boiling point within 2°C (that is, above) the boiling point of the constant-boiling mixture of 1,1,1-trichloroethane and the alcohol. Such compositions are especially suitable for cleaning printed circuit boards by a kiss-cleaning technique (described hereinafter in Example 2). The constant boiling mixture of 1,1,1-trichloroethane and the aliphatic alcohol is particularly preferred.

The compositions of the invention having a boiling point within 2°C of that of the constant boiling mixture do not chemically attack the materials of which the printed circuit board are made for example phenol-formaldehye resin/paper or epoxy resin/glass fibre laminates even when a warm solvent is used.

According to another feature of the invention we provide a method of cleaning the rear surface of printed circuit boards which comprises contacting said surface with a solvent composition comprising 1,1,1-trichloroethane and an aliphatic alcohol containing at least two carbon atoms having a boiling point within 2°C of the boiling point of the constant boiling composition of 1,1,1-trichloroethane and the alcohol.

The higher boiling compositions, that is, these boiling up to or near 5° or 10°C above that of the constant-boiling mixture are usually employed at or near ambient temperature.

The compositions boiling within 2°C of the constant boiling mixture may be employed at or above ambient temperatures and even close to or at the boiling point of the constant-boiling mixture. We prefer to employ substantially the azeotropic mixtures of 1,1,1-trichloroethane and the alcohols particularly since their use ensures that at the boil there is no preferential loss of one component of the mixture for example during purification of the compositions by distillation, although compositions which have boiling points within 2°C, more particularly within 1°C of the boiling points of the constant-boiling mixture, are also suitable.

The alcohol is suitable a saturated monohydric aliphatic alcohol containing at least two carbon atoms although we prefer to use acyclic alcohols containing at least 3 carbon atoms in the molecule since the flammability of the compositions decreases as the number of carbon atoms in the alcohol increases. We have found that alkanols having 3 to 5 carbon atoms in the molecule are particularly suitable. Examples of suitable alcohols are t-pentanol; sec-butanol; isobutanol; t-butanol; n-propanol; isopropanol and ethanol. We prefer to use n-propanol. Preferably the alcohol has a boiling point greater than 80°C.

If desired, the solvent composition may contain one or more stabilisers to inhibit metal induced decomposition or hydrolysis of the 1,1,1-trichloroethane. Any of the conventional stabilisers for 1,1,1-trichloroethane may be incorporated, for example dioxane, nitromethane, butylene oxide, amines and methyl isopropyl ketone. Further, the solvent composition may contain a surface active agent, if desired.

The compositions of the invention have the advantage compared with the known compositions comprising 1,1,1-trichloroethane or perchloroethylene in that they effectively remove the activators as well as the resinous components of solder fluxes. They have the additional advantage compared with perchloroethylene in that they evaporate readily from treated printed circuit boards and their removal does not require the use of heated air.

In some applications it may be advantageous to agitate the solvent composition mechanically, such as by ultrasonic agitation, during the cleaning operation. In addition means such as brushes may be provided for assisting the cleaning operation, if desired.

The time for which the rear surface of the printed circuit board is contacted with the solvent composition will usually be from 5 seconds to 20 seconds. In general, shorter treatment times are needed when the solvent is agitated than when it is not agitated.

The invention is illustrated but in no way limited by the following Examples.

EXAMPLE 1

1,1,1-trichloroethane of boiling point 74.1°C obtained by distillation of the crude material, was mixed with an equal quantity of n-propanol and the mixture was distilled through an Oldershaw column (25 actual plates) at a high reflux ratio to obtain a constant boiling (azeotropic) mixture. The constant boiling mixture so obtained was redistilled in a spinning band distillation system (estimated 125 to 200 plates) at a high reflux ratio (200:1) and atmospheric pressure. The resulting azeotrope was determined by gas chromatographic analysis during the operation. We have found that the azeotropic composition was unchanged during several hours running of the spinning band distillation column, indicating the formation of a true azeotrope.

The above procedure was then repeated using isopropanol instead of n-propanol.

The azeotropic compositions and normal boiling points are shown in Table 1.

Table 1

| Alcohol | Azeotrope Wt. % alcohol | B.P. °C |
|---|---|---|
| n-propanol | 7.1 | 72.3 |
| iso-propanol | 18.2 | 68.7 |

EXAMPLE 2

Printed circuit boards contaminated with a commercially available soldering flux sold under the trade name 'Multicure' PC25 were cleaned by a conventional kiss-cleaning technique using a constant-boiling (azeotropic) mixture of 1,1,1-trichloroethane and n-propanol and isopropanol as the cleaning compositions. The technique comprised passing the printed circuit boards horizontally above the surface of a table upon which waves of the cleaning composition at ambient temperature were created by pumping the composition upwardly through the table at its centre and allowing it to run freely off the edges of the table. Ultrasonic agitation was applied to the composition as it passed over the upper surface of the table. The system was arranged so that the bottom (rear) surfaces of the printed circuit boards contacted the cleaning composition. The printed circuit boards were contacted separately with the cleaning compositions for about 10 seconds after which they were withdrawn and allowed to dry. The treated surfaces of the printed circuit boards were free from the resinous components and the activators of the solder flux when using both solvent compositions.

COMPARISON

By way of comparison similarly contaminated surfaces of printed circuit boards were treated with 1,1,1-trichloroethane by the same technique. The surfaces however remained contaminated with the activator of the solder flux.

EXAMPLE 3

Printed circuit boards contaminated with a commercially available soldering flux sold under the trade name 'Alpha' 815-35 were treated by brushing the flux deposits with (a) a constant-boiling mixture of 1,1,1-trichloroethane and isopropanol and (b) a constant-boiling mixture of 1,1,1-trichloroethane and n-propanol. In both cases the treated surfaces of the printed circuit boards were found to be completely free of the flux.

What we claim is:

1. An azeotropic composition consisting essentially of 1,1,1-trichloroethane and n-propanol wherein the proportion of n-propanol is 7.1% by weight of the composition, said composition having a boiling point of 72.3°C.

2. A method of cleaning articles in which the article is a printed circuit board contaminated with soldering flux and in which the solvent composition is as claimed in claim 1.

3. A method of cleaning articles as claimed in claim 1 when using the kiss-cleaning technique.

* * * * *